Jan. 17, 1961 R. GOUIRAND 2,968,496
PNEUMATIC SUSPENSION FOR TRACTORS
Filed Oct. 22, 1958 3 Sheets-Sheet 1
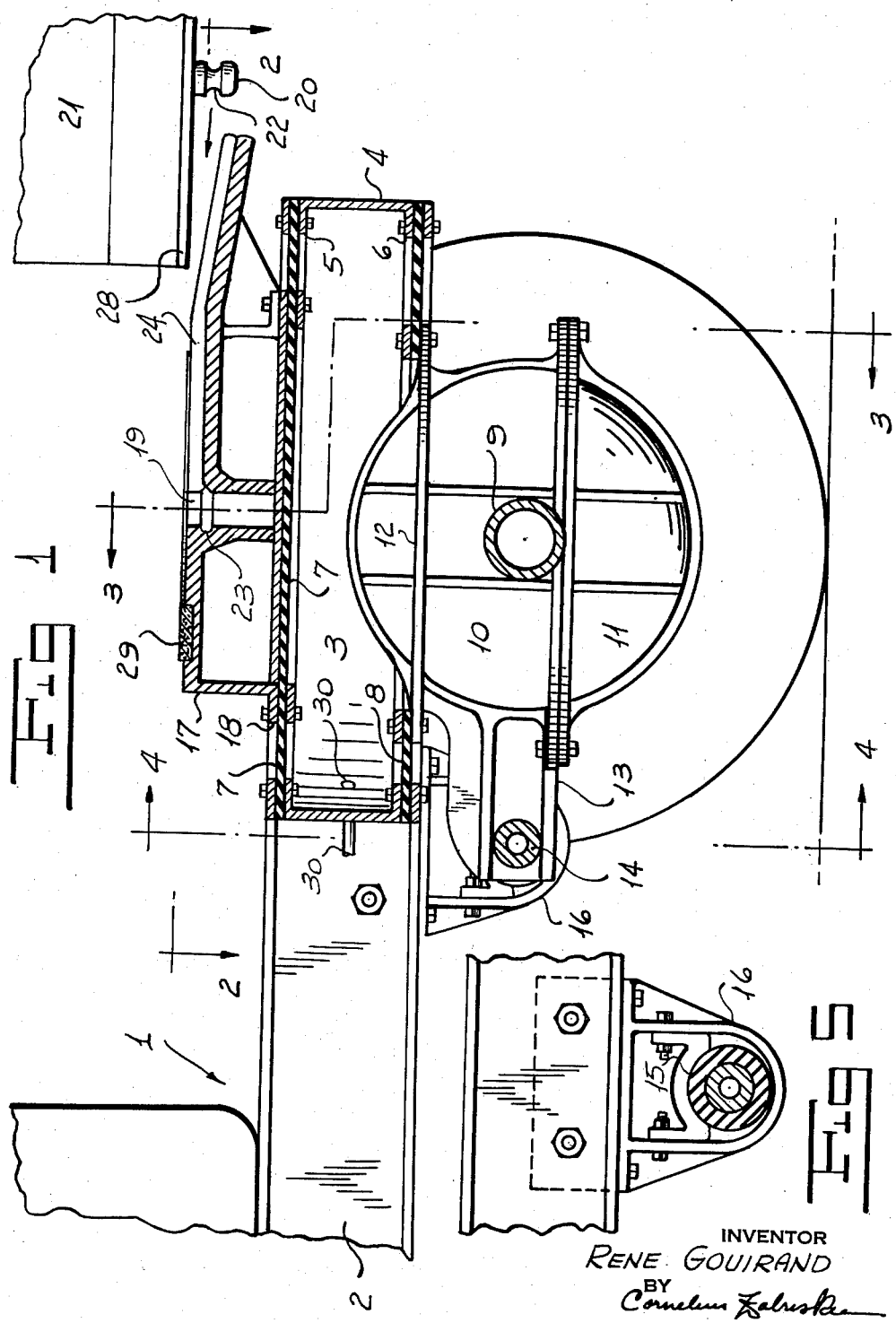
INVENTOR
RENE GOUIRAND
BY
Cornelius Zabriskie
ATTORNEY

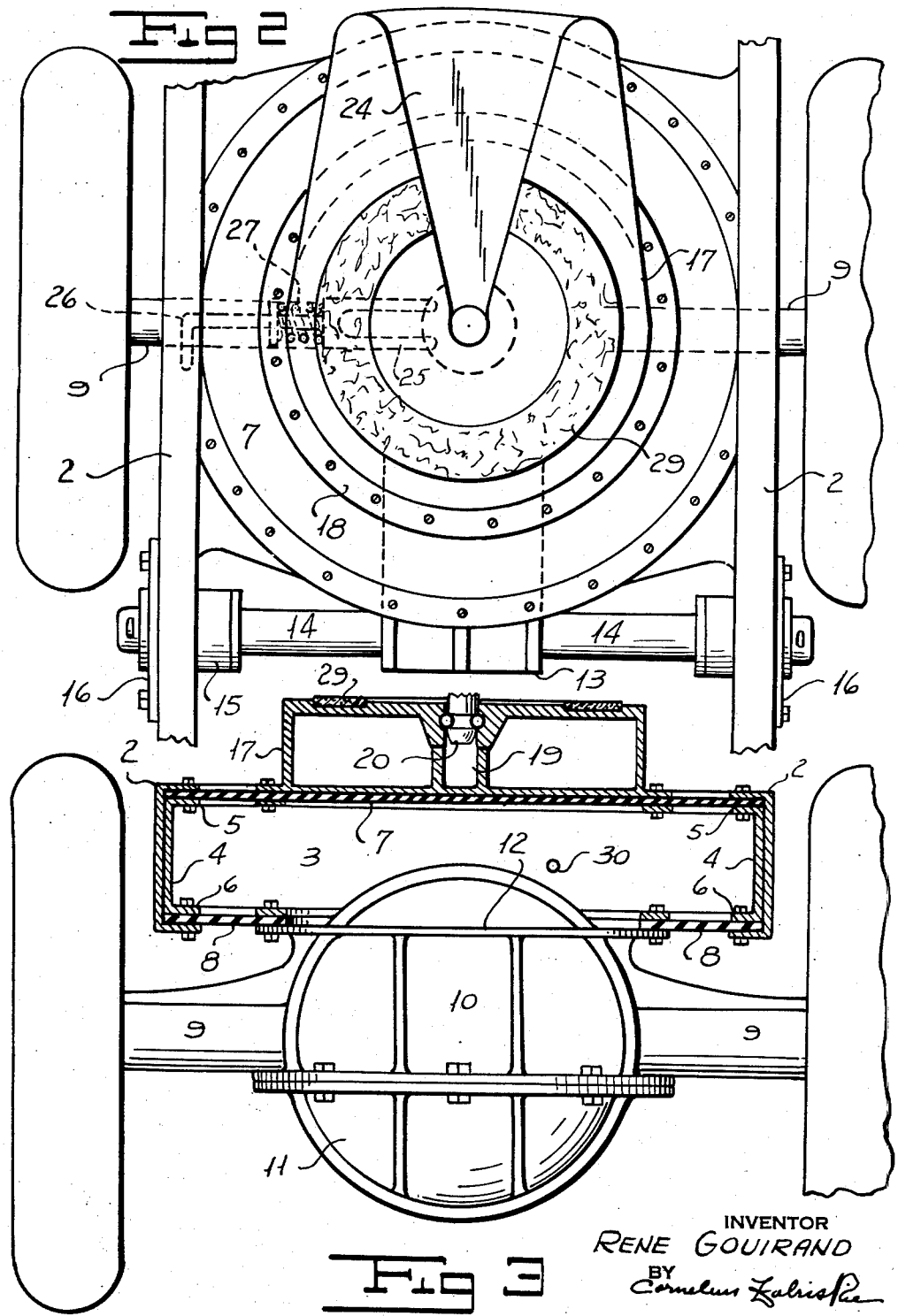

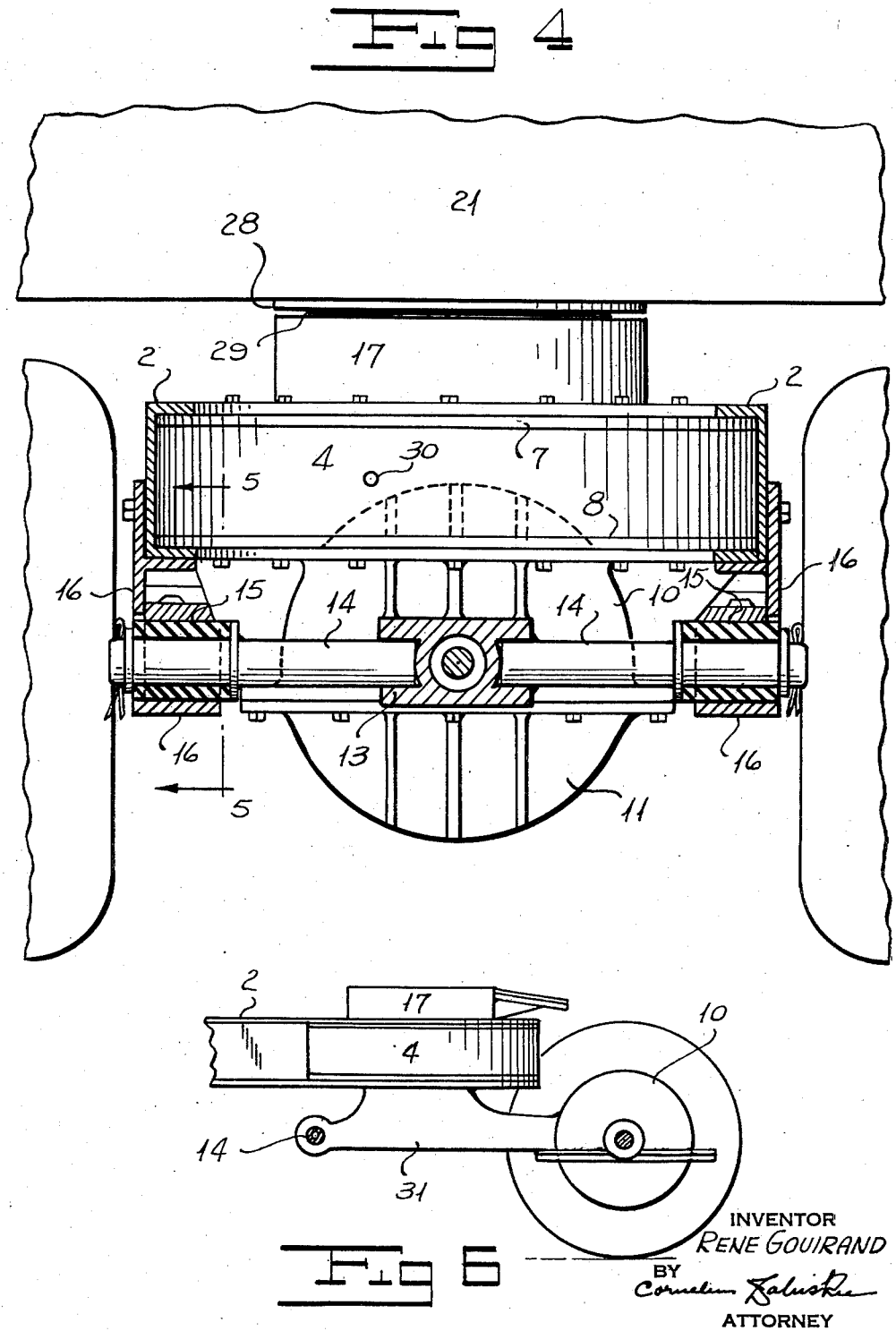

United States Patent Office 2,968,496
Patented Jan. 17, 1961

2,968,496
PNEUMATIC SUSPENSION FOR TRACTORS

Rene Gouirand, 210 W. 88th St., New York, N.Y.

Filed Oct. 22, 1958, Ser. No. 768,963

6 Claims. (Cl. 280—439)

This invention relates to a tractor and trailer combination and is directed, more particularly, to a pneumatic suspension for the rear axle and fifth wheel portion of the trailer.

It has heretofore been the practice in trailer construction to support the chassis frame of the tractor on steel springs interposed between the frame and the axle and to mount the lower platform of the fifth wheel for rocking movement on pivots extending transversely of such frame. This mounting provides little if any flexibility or cushioning action in the connection between the tractor and trailer to absorb braking and draft strains. Even though it has been the practice in the past to make the connection between the tractor and trailer very rugged, breakage of these connections is not infrequent. When this happens the trailer in many instances has plunged forwardly through the cab of the tractor, fatally injuring or killing the occupants thereof.

There has long been a need for a more resilient and yieldable connection between the tractor and the trailer, one wherein there is less wear than is the case with prior constructions, and one embodying a much greater factor of safety than heretofore.

The primary object of the present invention is to provide such a connection. A further object is to incorporate in that connection a pneumatic suspension for the fifth wheel and for the rear end of the tractor so that steel springs may be entirely eliminated. The structures shown in the accompanying drawings accomplish these objects.

Speaking generally, the present invention provides, at the rear of the chassis frame of the tractor, a pneumatic chamber provided at both its top and bottom with diaphragms. The lower diaphragm is connected to the rear axle of the trailer, while the upper diaphragm supports the lower platform of the fifth wheel assembly. These two diaphragms operate in opposed vertical relation against a compressed air cushion contained within the pneumatic chamber, thus imparting to the chassis frame per se what might be termed a unitary diaphragm suspension and to the lower platform a multiple diaphragm suspension from the axle.

With this construction the load of the forward end of the trailer is carried, in a sense, directly from the rear axle of the tractor in contradistinction to prior practice, wherein the frame of a tractor carries the weight of the trailer and in turn imposes that weight through the subjacent steel springs to the axle.

A further feature of the invention is directed to a novel way of maintaining the rear axle normal to the longitudinal axis of the tractor. This is accomplished by the use of a frame rigid with the rear axle, extending forwardly thereof, and mounted for pivotal movement on a transverse sway bar supported in stirrups at the opposite sides of the chassis frame. This frame not only maintains the axle in proper position, but also serves to minimize side sway, as will hereinafter be explained.

Features of the invention, other than those adverted to, will be apparent from the hereinafter detailed description and appended claims, when read in conjunction with the accompanying drawings.

These drawings illustrate different practical embodiments of the invention, but the constructions shown therein are to be understood as illustrative, only, and not as defining the limits of the invention.

Fig. 1 is a side elevation of a rear portion of a tractor showing certain parts thereof in vertical section, so as to more clearly exhibit the construction thereof. This view also shows in elevation a fragment of the forward end of a trailer.

Fig. 2 is a plan view of the salient parts illustrated in Fig. 1.

Fig. 3 is a transverse section on the broken line 3—3 of Fig. 1.

Fig. 4 is a section on the line 4—4 of Fig. 1.

Fig. 5 is a schematic side elevation showing a cantilever type of suspension which may be employed in lieu of that shown in Figs. 1–4 inclusive.

Fig. 6 is a side elevation showing a cantilever construction.

Referring to the drawings 1 indicates, generally, the rear end portion of a tractor embodying a chassis frame having side bars 2, shown as of channel section. Positioned between these side bars is a pneumatic chamber 3. This chamber is formed within an annular side wall 4, which may be referred to as the ring wall of the chamber. The wall 4 is circular, is provided at its upper and lower edges with inturned flanges 5 and 6 respectively, and is welded or otherwise rigidly secured to and between the side bars 2 of the frame.

Secured to the upper flange 5 is an upper diaphragm 7. This diaphragm is flexible and resilient and its attachment to the flanges 5 is such as to produce a hermetic seal therewith, and hermetically sealed to the lower flanges 6 is a lower diaphragm 8. Both diaphragms may be solid form periphery to periphery as is the diaphragm 7 or the central portion may be open as is illustrated in the diaphragm 8. However, I prefer to make the diaphragm 7 solid throughout and the diaphragm 8 with the opening as shown.

The rear axle housing 9 is provided at its center with a differential housing 10, the lower portion 11 of which is preferably demountable to permit access to parts of the differential therein. About the upper portion of the differential housing is an annular flange 12 which overlaps the inner margin of the lower diaphragm 8 and is secured thereto in any suitable manner, so that the bottom of the pneumatic chamber 3 is hermetically sealed.

As shown best in Figs. 1, 2 and 4, the differential housing 10 is provided with a forwardly extending axle frame 13 which is horizontally perforated to receive the inboard ends of alined sway bars 14 (see Fig. 4). The outboard ends of these sway bars pass through rubber bushings 15 supported within stirrups 16 depending from and rigid with the side bars 2 of the chassis frame. These sway bars serve to keep the rear axle housing 9 at right angles to the longitudinal medial line of the chassis frame and also serve to limit to an optimum degree any tendency of the chassis frame to sway. Some little sway relative to the trailer is desirable in order to compensate for unevenness in road surface and when making turns, but this relative sway should not be excessive for reasons well understood by those skilled in this art. The frame 13 has an opening 0 for the passage of the drive shaft.

With the axle held captive in a fore and aft direction by the frame 13 and sway bars, any vertical relative movement between the chassis frame and axle, due to loading or uneven road surfaces, results in arcuate movement of the axle about the axis of the sway bars. In order to compensate for the different radial distances between the front effective edge of the lower diaphragm 8 and the rear effective edge of such diaphragm, the opening in the center of that diaphragm is placed eccentrically of the center of that diaphragm, as shown in Fig. 1, so as to equalize stresses on the diaphragm and promote a highly satisfactory pneumatic suspension of the chassis frame above the axle.

Mounted on the upper diaphragm 7 is a fitting 17 which embodies the lower platform of the fifth wheel. This fitting has a flange 18 by means of which it is secured to the upper diaphragm 7. The fitting thus has a firm attachment to the central portion of the diaphragm and is provided with a central hole 19 adapted to receive the king pin 20 of the trailer 21. This pin has an annular groove 22 and the hole 19 also has a similar peripheral groove 23. The upper surface of the lower platform is formed with a tapering guide channel 24, so that the pin 20 may ride over the surface of this channel and be guided thereby into the hole 19. When in registration with the hole 19, the pin drops into this hole and is adapted to be secured in place against inadvertent displacement by the forked end 25 of a locking rod 26 which is normally impelled by a spring 27 into position wherein said forked end 25 will straddle the pin 20 within the groove 22. With this arrangement, the pin 20, which constitutes the king pin, will be locked to the lower platform 17 until the locking rod 26 is withdrawn to permit its release.

The upper platform 28 of the fifth wheel is supported on the trailer 21 and is adapted to rest upon an insert 29 let into the upper working surface of the lower platform. This insert is preferably of material similar to that used in brake lining which has the advantage that it does not require lubrication in order to permit rotation between the upper and lower platforms 28 and 17 respectively without undue friction.

Air under pressure is adapted to be introduced into the pneumatic chamber 3 through a tube connection 30, leading to an appropriate controlling valve which may be arranged to admit compressed air from any suitable source and to relieve the pressure from the pneumatic chamber as occasion may require. These controls may be mounted on the instrument board of the tractor or in any other suitable and convenient position.

With the construction described, a single pneumatic chamber serves as a common and unitary pneumatic suspension for both the chassis frame and for the forward end of the trailer. It has the novel peculiarity that the forward weight of the trailer imposed on the upper diaphragm 7 is communicated to the compressed air in the chamber 3 and from thence directly to the lower diaphragm 8 and differential housing 10 associated with the rear axle, so that it is not directly imposed upon the chassis frame per se. On the other hand, the chassis frame is supported primarily by the lower diaphragm, but both diaphragms cooperate with one another to cushion shocks from both sources, thus providing for unusually easy riding and lack of jar and vibration.

The diaphragms employed are of strong construction, so that they are well able to withstand draft and braking strains much more effectively than the relatively rigid constructions heretofore employed in conventional tractors. These diaphragms have inherent resiliency and flexibility and serve to effectually cushion all vertical shocks, as well as horizontal shocks, stresses and strains without breakage. Furthermore they provide greater safety than the prior conventional constructions because, even should they start to tear under tremendous strains such as induced by an accident or collision, they will release the air pressure from the pneumatic chamber before they will release the lower platform 17 of the fifth wheel and it will immediately drop into the pneumatic chamber and effectually preclude the trailer from driving forward into the cab of the tractor.

Experience with structures of this kind has shown that they do not require any leveling devices, and that this suspension is not conductive to undesirable swaying. It will permit relatively slight differential tilting in all directions as is necessary for the negotiation of curves or for slight swaying of the trailer but there is at no time any excessive sway with this construction.

In the embodiment of the invention which I have already described, the rear wheel of the tractor is mounted directly beneath the pneumatic chamber 3. However, if desired, I may employ the cantilever arrangement shown in Fig. 6. There the cantilever frame 31, pivoted on the sway bars 14, is secured intermediate its ends to a lower diaphragm such as hereinbefore described and extends rearwardly to and is rigid with the upper portion 10 of the differential housing of the rear axle, whereby the added advantages of a cantilever suspension are obtained.

The foregoing detailed description sets forth the invention in its preferred practical forms, but the invention is to be understood as fully commensurate with the appended claims.

Having thus fully described the invention, what I claim as new and desire to secure by Letters Patent is:

1. A tractor comprising: a chassis frame, a pneumatic cushion mounted on said frame and provided at both its top and bottom with flexible diaphragms, a running gear positioned below the chassis frame and secured to the lower diaphragm independently of the frame, and the lower platform of a fifth wheel assembly secured to the upper diaphragm independently of the frame.

2. A tractor according to claim 1, wherein the running gear comprises a rear axle assembly provided with an axle frame extending longitudinally of the tractor and pivoted to the chassis frame.

3. A tractor according to claim 2, wherein the pivotal connection between the chassis frame and the axle frame embodies a sway bar mounted in resilient bushings.

4. A tractor having a chassis frame, a ring wall of a pnematic chamber on said chassis frame, upper and lower diaphragms secured respectively to the upper and lower portions of said ring wall to form with said ring wall a hermetically sealed pneumatic chamber, a rear axle secured to the lower diaphragm, and the lower platform of a fifth wheel assembly secured to the upper diaphragm.

5. A tractor according to claim 4, wherein the rear axle is secured to the lower diaphragm nearer to the front end of the diaphragm than to the rear end thereof.

6. A tractor according to claim 4, wherein the lower diaphragm is of annular form and the rear axle embodies a differential housing provided with a peripheral flange, the margin of which overlaps and is hermetically sealed to the inner margin of the lower diaphragm.

References Cited in the file of this patent

UNITED STATES PATENTS

| | | |
|---|---|---|
| 1,348,241 | Press | Aug. 3, 1920 |
| 1,513,381 | Edwards | Oct. 28, 1924 |
| 2,560,133 | Schroeter | July 10, 1951 |
| 2,602,714 | Wheildon | July 8, 1952 |
| 2,733,931 | Reid et al. | Feb. 7, 1956 |
| 2,747,862 | Gouirand | May 29, 1956 |
| 2,790,634 | Fawick | Apr. 30, 1957 |